(12) United States Patent
Sexton

(10) Patent No.: US 7,374,489 B2
(45) Date of Patent: May 20, 2008

(54) STEERING WHEEL ADAPTED FOR CONNECTION TO FINGER DIAL OF RC CONTROL UNIT

(76) Inventor: Charles Sexton, 20652 Lassen St., #72, Chatsworth, CA (US) 91311

( * ) Notice: Subject to any disclaimer, the term of this patent is extended or adjusted under 35 U.S.C. 154(b) by 810 days.

(21) Appl. No.: 10/677,949

(22) Filed: Oct. 1, 2003

(65) Prior Publication Data

US 2004/0259639 A1    Dec. 23, 2004

Related U.S. Application Data

(60) Provisional application No. 60/474,557, filed on May 28, 2003.

(51) Int. Cl.
*A63F 13/00* (2006.01)
*H04L 17/02* (2006.01)
(52) U.S. Cl. .................. 463/36; 446/454; 341/176
(58) Field of Classification Search ............ 446/454, 446/456; 463/36, 46; 345/161, 176; 340/825.69; 273/148 R, 148 B; 341/176; D21/566
See application file for complete search history.

(56) References Cited

U.S. PATENT DOCUMENTS

| | | | |
|---|---|---|---|
| 2,036,948 A | 4/1936 | McNary | |
| 3,392,485 A | 7/1968 | Asano | |
| 4,882,942 A * | 11/1989 | Hamilton | ............ 74/104 |
| 4,984,931 A | 1/1991 | Struthers et al. | |
| 5,158,495 A | 10/1992 | Yonezawa | |
| 6,112,619 A | 9/2000 | Campbell | |
| 6,113,459 A | 9/2000 | Nammoto | |
| 6,287,167 B1 | 9/2001 | Kondo | |
| 6,428,383 B1 | 8/2002 | Allmon et al. | |
| D464,684 S | 10/2002 | Arai et al. | |
| 7,029,363 B2 * | 4/2006 | Ogihara | ............ 446/454 |
| 7,102,561 B2 * | 9/2006 | Tokita | ............ 341/176 |
| 7,202,806 B2 * | 4/2007 | Mukaida | ............ 341/176 |
| 2002/0196174 A1 | 12/2002 | Lai | |

OTHER PUBLICATIONS

Futaba Digital Proportional R/C system, "3PK 3-Channel Radio Control System Instruction Manual", 2002, 6 pages total.☐☐PDF available at http://manuals.hobbico.com/fut/3pk-manual.pdf.*

* cited by examiner

*Primary Examiner*—Robert E. Pezzuto
*Assistant Examiner*—Alex F. R. P. Rada, II
(74) *Attorney, Agent, or Firm*—Kelly Lowry & Kelley LLP

(57) ABSTRACT

A steering wheel adapted for replacing a rotatable control shaft-mounted finger dial of an RC control unit includes a wheel having a diameter at least as large as at least one dimension of a side of the RC control unit adjacent to the wheel, a coupler located on one side of the wheel for engaging the RC control unit, and at least one bore passing through the wheel. A fastener is positioned within the bore for removably connecting the wheel to the control shaft of the RC control unit.

10 Claims, 2 Drawing Sheets

STEERING WHEEL ADAPTED FOR CONNECTION TO FINGER DIAL OF RC CONTROL UNIT

RELATED APPLICATION

Priority is claimed to Provisional Patent Application Ser. No. 60/474,557, filed May 28, 2003.

BACKGROUND OF THE INVENTION

The present invention generally relates to radio control (RC) units that are usable to maneuver a radio controlled vehicle, such as a small race car. More particularly, the present invention relates to a steering wheel adapted for connection to the finger dial of an RC control unit.

Radio controlled model vehicles, such as boats, aircraft and cars are a well-known and popular hobby among people of all ages. Various types of remote controllers are used to steer the vehicles during remote controlled operation. These remote controllers regulate the actual directional movement and speed of the remote controlled model vehicle. One type in particular, the hand-held radio remote control provides wireless control of a model vehicle using a rotatable dial, joy stick, switch, lever or other mechanism to control the direction of the model vehicle. For example, a typical RC control unit used for racing an RC model car is in the form of a hand-held unit with a trigger for controlling the acceleration and deceleration of the RC car, and a finger dial for controlling the direction of the car. However, controlling the direction utilizing a finger dial is quite difficult as the relatively small size of the finger dial and the relatively large size of the human hand turning the dial do not provide the user the ability to make fine adjustments in direction in a limited period of time as the relatively small diameter of the dial may cause a user to turn the dial too far or too little.

Various attempts have been made to improve remote control of model vehicles. For example, U.S. Pat. No. 5,158,495 discloses a remotely controlled vehicle and controller. However, this controller relies on a small steering wheel finger dial such as that described above. This steering wheel likewise suffers from the defect in that the relatively small size of the steering wheel prevents fine adjustment of direction. In another example, U.S. Pat. No. 6,113,459 discloses a remote toy steering mechanism. However, this steering mechanism is similar in size to a conventional steering wheel and is not capable of being used in conjunction with a hand-held remote control unit.

Accordingly, there is a need for a remote control unit with an improved steering wheel. There is a further need for a remote control steering wheel that is larger than conventional finger dials yet small enough to be integrated on a conventional hand-held remote control unit. There is an additional need for a remote control steering wheel that is adaptable to a conventional remote control unit. The present invention fulfills these needs and provides other related advantages.

SUMMARY OF THE INVENTION

The present invention comprises an improved steering wheel for a remote control unit. The steering wheel is larger than conventional finger dials yet small enough to be integrated on a conventional hand-held remote control unit. The steering wheel is adaptable to replace the finger dials of conventional remote control units. The size of the conventional remote control finger dial is increased by mounting a steering wheel embodying the present invention onto the RC control unit. The steering wheel is formed as a replacement for the finger dial of the RC control unit. The finger dial is removed from the RC control unit and the steering wheel put in its place.

The present invention further comprises an RC control assembly which includes a steering wheel having a diameter at least as large as at least one dimension of a side of an RC control unit adjacent to the wheel. The assembly further includes an RC control unit body including a rotatable control shaft. A coupler is located on one side of the steering wheel for engaging the rotatable control shaft.

The steering wheel includes at least one bore passing through the steering wheel. A fastener is positioned within the bore for removably connecting the steering wheel to the RC control unit. The coupler includes a rod extending from the steering wheel for matingly engaging the control shaft. The bore passes through the rod, and the shaft includes an aperture for receiving the fastener. The steering wheel also includes a plurality of apertures positioned radially about the coupler, the apertures being sized so as to accommodate the fingers of a user.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
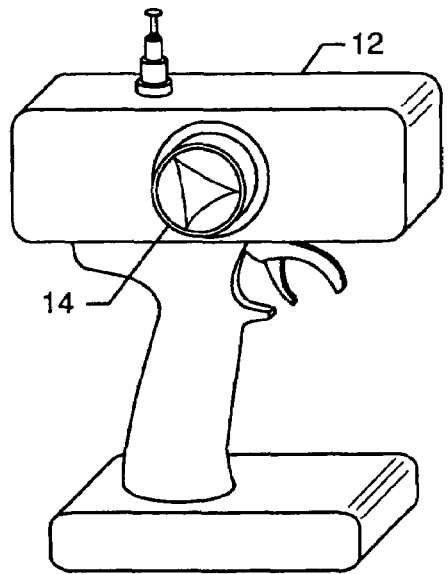
FIG. 1 is an orthogonal view of a conventional remote control unit.
Figure 2:
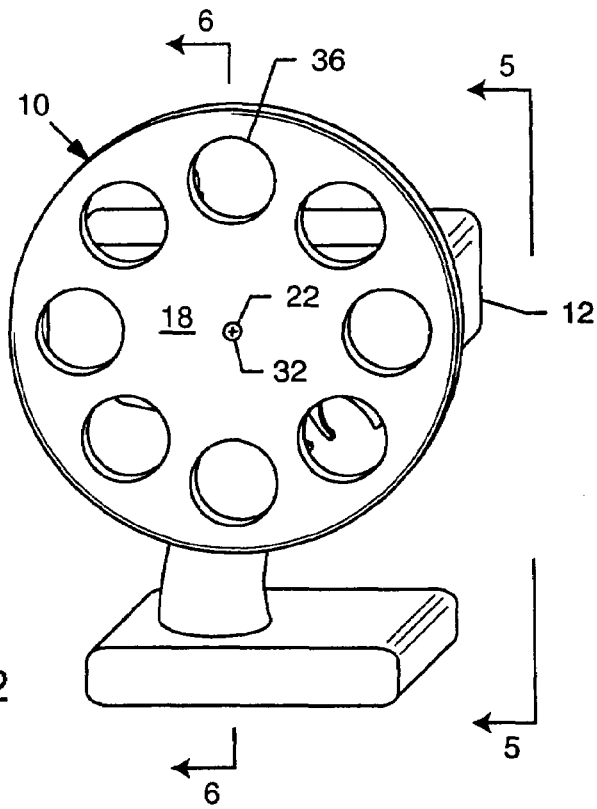
FIG. 2 is an orthogonal view of a steering wheel embodying the present invention that is integrated onto the remote control unit of FIG. 1.

As illustrated in FIGS. 2-6, the present invention resides in a steering wheel 10 for a RC control unit 12 with a rotatable control shaft-mounted finger dial 14. The steering wheel 10 is adapted to replace the finger dial 14 of the RC control unit 12 of FIG. 1 by engaging the rotatable control shaft 16 of the RC control unit. The steering wheel 10 includes a main body 18, a central hub or coupler 20 located on one side of the main body 18, and a central bore 22 located at the center of the main body 18. The central bore 22 assists the user to hold the steering wheel 10 on to the control unit 12.

The main body 18 of the steering wheel 10 is generally circular; having a diameter at least as large as at least one dimension of a side of the RC control unit 12 adjacent to the steering wheel 10.

The coupler 20 is located on the rear side of the main body 18. The coupler 20 is the portion of the steering wheel 10 which engages the RC control unit 12. The coupler 20 includes an arcuate portion 24 designed to prevent the steering wheel 10 from turning more than a predetermined distance. The length of the arcuate portion 24 is determines how far the steering wheel 10 can turn when mounted on the control unit 12. The control unit 12 also has an arcuate portion 26 partially about the rotatable control shaft 16. The steering wheel 10 can only be turned a set distance in either direction (i.e., to the left or to the right) before at least one end of the arcuate portion 24 of the steering wheel 10 abuts against at least one end of arcuate portion 26 of the control unit 12.

Figure 3:
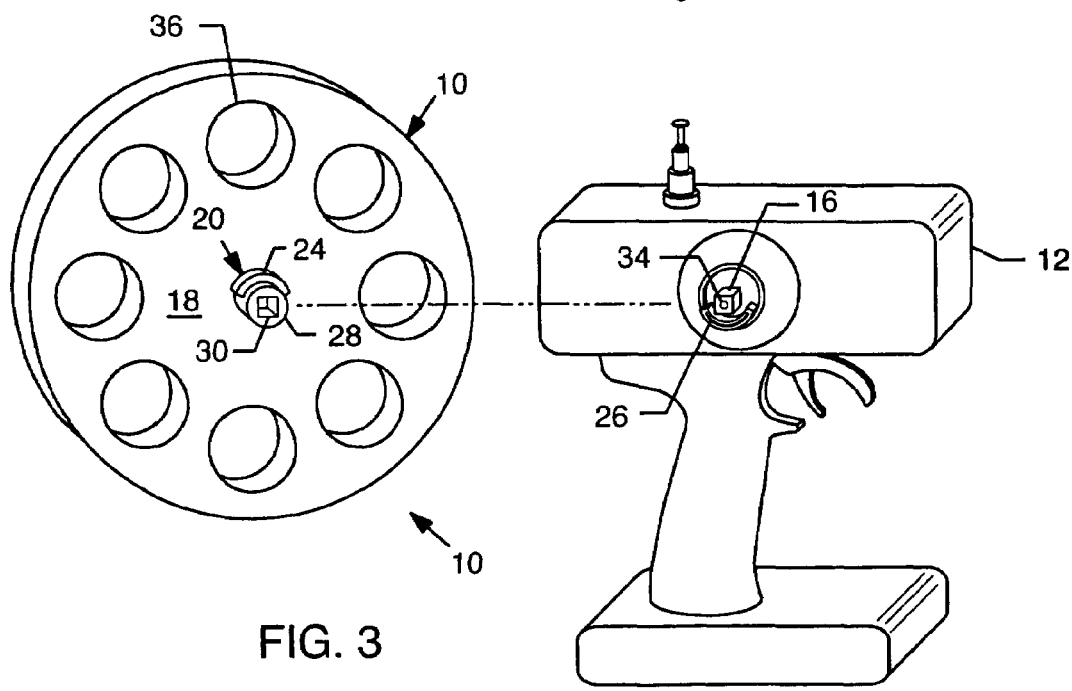
FIG. 3 is an orthogonal view of the steering wheel and remote control unit of FIG. 2 showing the rear side of the steering wheel and the front side of the remote control unit.
Figure 4:
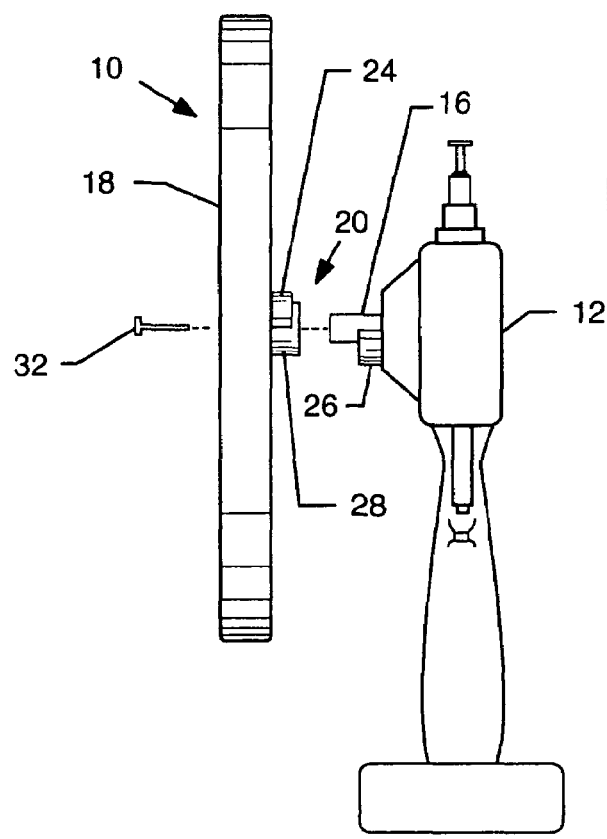
FIG. 4 is a partially exploded side elevation view of the steering wheel and remote control unit showing the fastener, steering wheel and the remote control unit.
Figure 5:
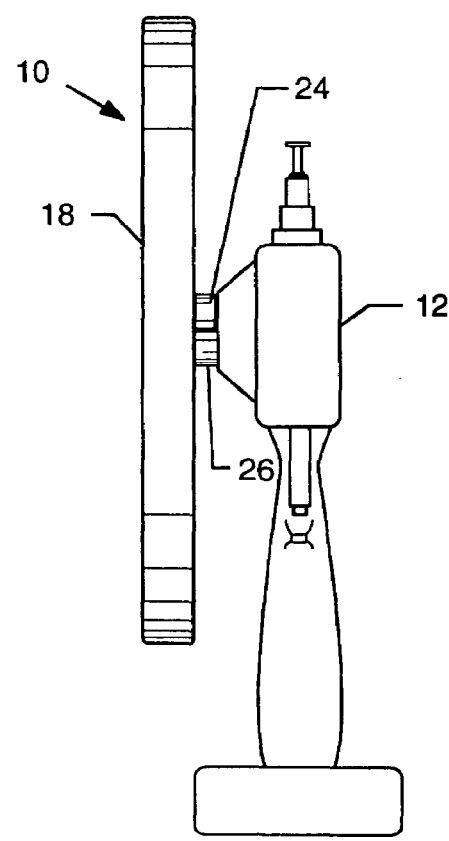
FIG. 5 is a side elevation view of the steering wheel of FIG. 2 taken along line 5-5 of FIG. 2.
Figure 6:
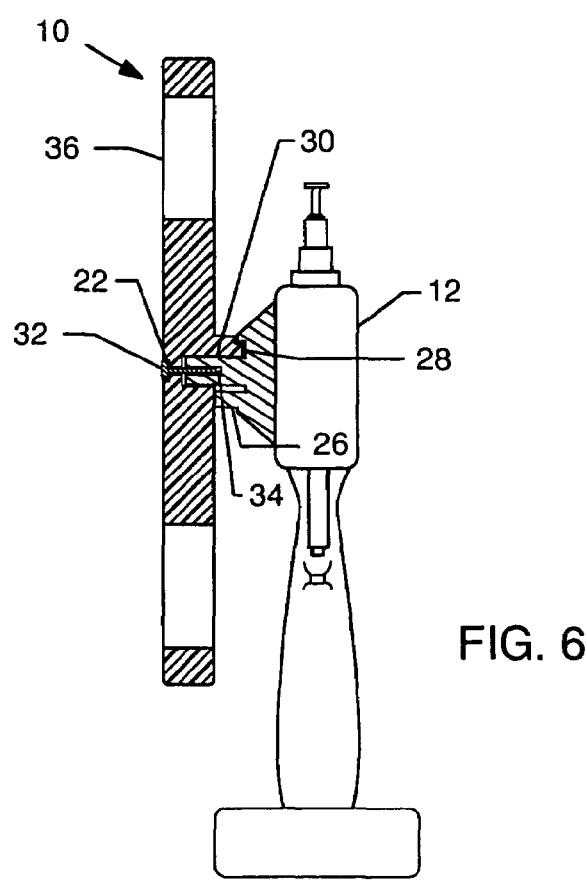
FIG. 6 is a cross-sectional side elevation view of the steering wheel of FIG. 2 taken along line 6-6 of FIG. 2.

The coupler 20 also includes a rod 28 extending from the main body 18 for matingly engaging the control shaft 16. The rod 28 includes a bore 30 that is shaped to receive the control shaft 16 of the control unit 12. The shape of the bore 30 may be square (as shown in FIG. 3), round, triangular, rectangular or any polygonal shape which matches the shape of the control shaft 16 (shown as square in FIG. 3).

The central bore 22 passes through the main body 18 of the steering wheel 10. A fastener 32 is positioned within the bore 22 for removably connecting the steering wheel 10 to the control shaft 16 of the RC control unit 12. The fastener 32 may be in the form of a screw, nail or the like. The bore 22 passes through the rod 28. The control shaft 16 includes an aperture 34 for receiving the fastener 32. The aperture 34 may be threaded so as to engage a threaded fastener 32.

The steering wheel 10 further includes a plurality of apertures 36 positioned radially about the coupler 20 generally between the center of the main body 18 and the perimeter of the main body 18. The apertures 36 are sized so as to accommodate the fingers of a user.

The steering wheel 10 may be formed from a variety of materials including, without limitation, metal (e.g., aluminum, stainless steel, titanium or the like), plastic, wood or the like.

In the alternative, the steering wheel 10 can be adapted so that the coupler 20 is adapted so that the interior diameter of the coupler 18 is sized so as to fit over the exterior diameter of the finger dial 14 of the RC control unit 12. For the most part, the main body 18 would be similar to the one described above, including the plurality of circular apertures 36 distributed about the center of the main body 18. However, in this alternative embodiment, a large central aperture would be located at the center of the main body 18 that would allow the user to view the top of the finger dial 14 when the steering wheel 10 is mounted thereon.

The coupler 20 would include first and second portions which hold the coupler 20 on the finger dial 14 by sandwiching the finger dial 14 between each portion within a recess formed by the mating of the two portions. The first and second portions are generally arcuate, preferably semicircular, though the length of the arc created by each portion may vary. A rim would run along the circumference of each portion and include a flanged lip that fits over the back portion of the finger dial 14 (i.e., the side facing but spaced from the control unit 12) such that the finger dial 14 is contained within the coupler 20. Each of the portions further include an exterior flange around the circumference of the portions. Each flange includes at least two threaded apertures. When the two portions are fitted together around the finger dial 14, the threaded apertures are aligned with threaded apertures located on the main body 18 of the steering wheel 10. Set screws are then used to mate the coupler first and second portions to the main body 18. The threaded apertures in the main body 18 are slightly recessed so that the head of each set screw is flush with the surface of the main body 18.

In another alternative, each of the first and second portions of the coupler 20 may include at least one threaded aperture that allows a set screw to be extended therethrough. The set screw can be tightened against the exterior diameter of the finger dial 14 to provide additional holding power to keep the steering wheel 10 fixed in place over the finger dial 14. In a further alternative, the two portions of the coupler 20 may be clamped together by a hose clamp placed around the exterior diameter of the two portions. In yet another alternative, at least one of the two portions of the coupler 20 may be formed as a single piece with the main body 18.

In still another alternative, the steering wheel may come in various shapes including, without limitation, the shape of the yoke of an aircraft.

In a further alternative, each of the coupler portions may include a coupling flange on each side of the portions extending perpendicular from the surface of the portion and perpendicular to the exterior flanges. Each coupling flange includes a threaded aperture. The purpose of the coupling flanges is to mate the coupler portions to each other. When the apertures on the coupling flanges associated with first portion are aligned with the apertures on the coupling flanges associated with the second portion and the coupling flanges of each portion are adjacent to each other, set screws are passed through the apertures in the coupling flanges and tightened so that the coupler portions are held together.

The above-described embodiments of the present invention are illustrative only and not limiting. It will thus be apparent to those skilled in the art that various changes and modifications may be made without departing from this invention in its broader aspects.

What is claimed:

1. A steering wheel adapted for replacing a rotatable control shaft-mounted finger dial of an RC control unit, comprising:
   a wheel having a diameter at least as large as the height of the RC control unit adjacent to the wheel;
   a coupler located on one side of the wheel for engaging the RC control unit, wherein the coupler includes a rod extending from the wheel for matingly engaging the control shaft; and
   at least one bore passing through the wheel;
   wherein a fastener is positioned within the bore for removably connecting the wheel to the control shaft of the RC control unit.

2. The steering wheel of claim 1, wherein the bore passes through the rod, and the control shaft includes an aperture for receiving the fastener.

3. The steering wheel of claim 1, wherein the wheel includes a plurality of apertures positioned radially about the coupler, the apertures being sized so as to accommodate the fingers of a user.

4. A steering wheel adapted for replacing a rotatable control shaft-mounted finger dial of an RC control unit, comprising:
   a wheel having a diameter at least as large as the width of the RC control unit adjacent to the wheel;
   a coupler located on one side of the wheel for engaging the RC control unit, wherein the coupler includes a rod extending from the wheel for matingly engaging the control shaft, and wherein the wheel includes a plurality of apertures positioned radially about the coupler, the apertures being sized so as to accommodate the fingers of a user; and at least one bore passing through the wheel;

wherein a fastener is positioned within the bore for removably connecting the wheel to the control shaft of the RC control unit.

5. The steering wheel of claim 4, wherein the bore passes through the rod and the shaft includes an aperture for receiving the fastener.

6. An RC control assembly, comprising:

a steering wheel having a diameter at least as large as at least one dimension of a side of an RC control unit adjacent to the wheel;

an RC control unit body including a rotatable control shaft;

a coupler located on one side of the steering wheel for engaging the rotatable control shaft;

wherein the steering wheel includes at least one bore passing through the steering wheel, and a fastener is positioned within the bore for removably connecting the steering wheel to the RC control unit; and wherein the coupler includes a rod extending from the steering wheel for matingly engaging the control shaft.

7. The RC control assembly of claim 6, wherein the bore passes through the rod, and the shaft includes an aperture for receiving the fastener.

8. The RC control assembly of claim 6, wherein the wheel includes a plurality of apertures positioned radially about the coupler, the apertures being sized so as to accommodate the fingers of a user.

9. An RC control assembly, comprising:

a steering wheel having a diameter at least as large as the height of an RC control unit adjacent to the wheel and including at least one bore passing through the wheel;

an RC control unit body including a rotatable control shaft;

a fastener positioned within the bore for removably connecting the wheel to the RC control unit;

a coupler located on one side of the steering wheel for engaging the rotatable control shaft, wherein the coupler includes a rod extending from the wheel for matingly engaging the control shaft; and a plurality of apertures positioned radially about the coupler, the apertures being sized so as to accommodate the fingers of a user.

10. The RC control assembly of claim 9, wherein the bore passes through the rod, and the shaft includes an aperture for receiving the fastener.

* * * * *